April 11, 1939. P. G. EXLINE 2,153,917

CHART FOR RECORDING INSTRUMENTS

Filed Sept. 24, 1936

Inventor
Paul G. Exline,
By A. M. Houghton
   his Attorney

Patented Apr. 11, 1939

2,153,917

UNITED STATES PATENT OFFICE 2,153,917

CHART FOR RECORDING INSTRUMENTS

Paul G. Exline, O'Hara Township, Allegheny County, Pa., assignor to Gulf Research & Development Company, Pittsburgh, Pa., a corporation of Delaware Application September 24, 1936, Serial No. 102,425

3 Claims. (Cl. 234—70)

This invention relates to charts for recording instruments; and it comprises an improved chart for recording apparatus of the type adapted to form graphic records and having stylus means and curved chart-holding means movable with respect thereto, the improved chart comprising a stiff resilient member of aluminum or other soft, resilient metal, preformed accurately to a curved shape and adapted to closely fit the chart-holding means, whereby greater accuracy and uniformity of records is obtained; and it further comprises a chart for use in combination with chart-holding means and an engraving stylus, the chart being of smooth surfaced aluminum; all as more fully hereinafter set forth and as claimed.

There have recently been developed recording pressure gages for use in studying conditions existing in oil wells, the gages being adapted, upon being lowered into the well and withdrawn therefrom, to give a continuous record of pressures existing at every level in the well. A typical gage of this type comprises an elongated housing cylinder having therein pressure responsive mechanism, a stylus, a recording drum with chart and clockwork for driving the drum. The clockwork rotates the drum and chart at slow, constant speed and the stylus moves over the chart, marking a record thereon. In order to secure useful data with such instruments, pressure measurements must be quite accurate over the entire range of zero pounds per square inch gage at the surface to 2000 pounds or more near the bottom of the well. Accordingly every part of the depth gage is designed and constructed with considerable care.

The recording drum in these gages is ordinarily a cylinder concentric with the main housing. As the diameter of the gages must be small, so that they can be lowered into narrow tubing, the diameter of the recording drum is small and it is a problem to secure an accurate chart record. In conventional prior art apparatus the chart is an ordinary metallized paper chart such as has been used in steam engine indicators for many years. Such a chart is not altogether satisfactory, for several reasons. The chart paper is subject to alternation in size upon changing weather conditions. The surface is not very smooth and does not give a really sharp record. Furthermore, it is difficult to dispose the chart on the drum in the form of a true cylinder. Unless the recording surface is a true cylinder a spurious change of indication will occur at those points where the surface departs from cylindrical. Ordinarily a flat piece of chart material when placed inside a cylindrical tube or drum, will not assume a true cylindrical shape but will tend to remain flat wherever possible. Furthermore, in the ordinary procedure of bending the chart with the fingers and introducing it into the drum by hand, there is danger of getting a too sharp curvature at certain points. In an attempt to avoid these difficulties, it is customary to apply adhesive to as many points as possible. This has the disadvantage of introducing liability of tearing of the chart on removal and necessity of removing excess adhesive from the drum wall at frequent intervals. Moreover, if the adhesive layer is not quite thin and regular, the accuracy of the records will suffer.

According to the present invention accurate records are insured and the difficulties of the prior art procedures obviated by providing a chart for such instruments in the form of a preformed cylinder closely conforming to the walls of the drum. The chart is made of metal which not only obviates dimensional changes due to weather conditions, but also causes the chart to remain firmly in place by its own resilience.

In the accompanying drawing are shown, more or less diagrammatically, two examples of specific embodiments of charts within the invention, also illustrations of the deficiencies of prior art methods. In the showings:

Figure 1:
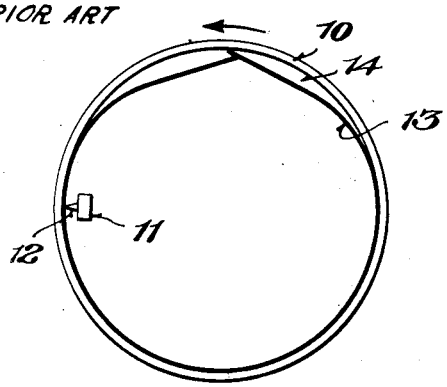
Figs. 1 and 2 are diagrammatic views showing the failure of ordinary charts of the prior art to maintain a true surface.
Figure 2:
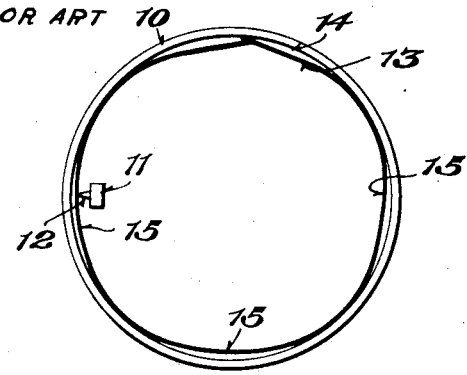

Figs. 1 and 2 are to illustrate typical disadvantageous conditions which are corrected by use of the present invention. Fig. 1 shows the recording drum 10 of a known recording apparatus (not shown) adapted to be rotated by known mechanism, not shown, about the axis of the drum. A stylus arm 11 with marking point 12 is disposed adjacent the drum and is adapted to be reciprocated in a direction parallel to the axis of the drum, by mechanism responsive to the variable under test. In ordinary practice, the chart is a flat rectangular sheet of metallized paper or in some cases metal backed paper. This is rolled up and slipped into the drum. It takes a form substantially as illustrated in Fig. 1. Portions of the chart adjacent the lap by no means hug the drum; they leave a wide gap as indicated at 14. Fig. 2 shows what happens when it is attempted to give a chart an approximate contour with the fingers. Flat places are left as indicated at 15. By using plenty of adhesive the charts can be kept against the cylinder wall in a fairly satisfactory manner, but the use of adhesive is disadvantageous for the reasons described previously.

Figure 3:
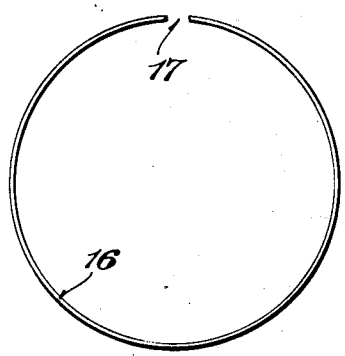
Fig. 3 is a view of one form of chart within the purview of the invention.
Figure 4:
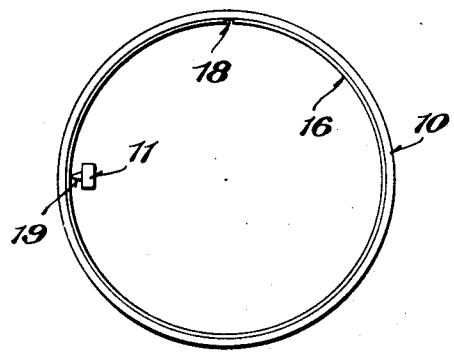
Fig. 4 shows the chart of Fig. 3 mounted in a drum.

According to the present invention there is provided a chart advantageously consisting of sheet metallic aluminum. The chart is in the form of a cylinder 16, preformed accurately as indicated in Fig. 3. The chart is preformed to have a diameter, in relaxed condition, very slightly greater than the inside diameter of the cylinder, leaving a small gap as at 17. Then, upon simply slipping the chart into the cylinder, as indicated in Fig. 4, the chart accurately fits the cylinder walls, covering the surface except, perhaps, for a narrow gap as at 18. Errors due to inaccurate contour are eliminated. Ordinarily the natural resiliency of the chart is sufficient to keep it snugly in place.

While various marking schemes can be used in conjunction with such chart a diamond point stylus has been found most useful. This is indicated at 19 in Fig. 4. Such a point gives an exceedingly fine and regular line record on the aluminum surface. While aluminum is convenient, the chart may also be embodied in other resilient but relatively soft metals such as hardened copper, brass and certain alloys.

Figure 6:
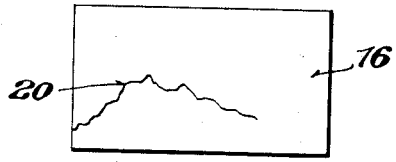
Fig. 6 is a view of one chart of the present invention developed, that is, rolled out flat.

After the record is made the chart is removed from the drum and laid out flat as indicated in Fig. 6, for measurement. The record appears as at 20 in Fig. 6.

Figure 5:
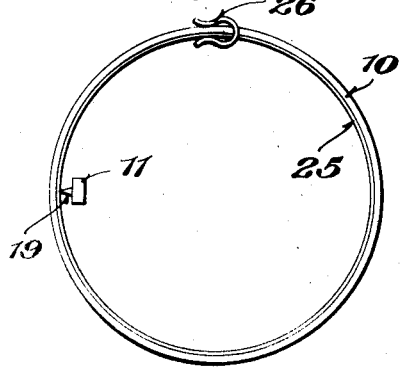
Fig. 5 is a view of another form of chart.

Fig. 5 shows a modification of the invention useful in certain relations. The chart is in the form of a thin-walled aluminum tube 25 of such size as to fit snugly inside the drum 10. To prevent slippage it is advisable to use some sort of clip or clamp as indicated at 26 with this modification. When the record is complete the tube is slipped out of the drum, slitted along an element with a pair of shears and spread out flat for measuring.

The thickness of the chart when aluminum is use is conveniently 0.003 to 0.008 inch. This thickness is sufficient to give the chart the necessary stiffness and resiliency, and to obviate danger of tearing or distortion of the chart by the marking stylus.

The advantages of the invention are realized to some degree in instruments where the chart is held on the outside of the drum. Similar considerations apply. The chart, of course, finds application in other apparatus besides deep well gages; in steam engine indicators, for example.

In making the chart, a convenient way is to lay a piece of thin aluminum sheet of suitable size and thickness on a soft rubber pad and pass a round roller over the sheet with some pressure. This curves the sheet into substantially a circular cylinder of approximately twice the diameter of the roller. Or, thin walled aluminum tubing can be used, in the way shown in Fig. 5 or it can be slit prior to use to form a cylinder as shown in Figs. 3 and 4.

The term "cylinder" is used in its geometrical sense, as including all surfaces generated by a line moving parallel to a fixed line, that is, the chart holding means and the chart need not necessarily have a circular contour, or be closed curves. The invention is also well adapted for use with chart holding means having curved contours other than cylindrical, e. g. truncated cones, the chart in all cases being preformed accurately to substantially the desired shape.

What I claim is:—

1. A chart for use in recording apparatus of the type adapted to form graphic records and having stylus means and cylindrical chart holding means cooperating therewith, the chart comprising a resilient cylinder of sheet aluminum of thickness about 0.003 to 0.008 inch, the cylinder being of substantially the same diameter as the chart holding means and adapted to be held close against the chart holding means by its own resiliency.

2. In recording apparatus having chart holding means and a very hard, pointed marking stylus, the combination of a chart comprising a resilient sheet of aluminum adapted to be held close against the chart holding means without bulges, by the resiliency of the sheet, and adapted to have the record engraved thereon by the stylus as a fine line.

3. In combination with measurement-recording instruments having curved chart-holding means and a fine-pointed hard chart-engraving stylus movable with respect thereto, a chart precisely preformed to a smooth curved shape closely fitting the chart-holding means so as to be applied thereto closely without deformation or distortion, and being of thin, smooth surfaced sheet metal having a resiliency and hardness similar to the resiliency and hardness of sheet aluminum, and cooperating with the engraving stylus to produce a fine-line record; the chart metal being of the order of 0.003 to 0.008 inch in thickness whereby it is sufficiently thin so that it can be laid flat for measurement without appreciable distortion of the record thereon and is thick enough to withstand the action of the engraving stylus without injury.

PAUL G. EXLINE.